(12) United States Patent
Liu et al.

(10) Patent No.: US 10,669,477 B2
(45) Date of Patent: Jun. 2, 2020

(54) QUANTUM DOT AND METHOD FOR MANUFACTURING THE SAME

(71) Applicant: INDUSTRIAL TECHNOLOGY RESEARCH INSTITUTE, Hsinchu (TW)

(72) Inventors: Yi-Chun Liu, Zhudong Township (TW); Yu-Yang Su, New Taipei (TW); Chun-Hsiang Wen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 378 days.

(21) Appl. No.: 15/806,995

(22) Filed: Nov. 8, 2017

(65) Prior Publication Data

US 2018/0127649 A1 May 10, 2018

Related U.S. Application Data

(60) Provisional application No. 62/419,044, filed on Nov. 8, 2016.

(51) Int. Cl.
| | | |
|---|---|---|
| *C09K 11/70* | (2006.01) | |
| *B22F 1/02* | (2006.01) | |
| *B22F 1/00* | (2006.01) | |
| *B82Y 20/00* | (2011.01) | |
| *B82Y 40/00* | (2011.01) | |

(52) U.S. Cl.
CPC .............. *C09K 11/703* (2013.01); *B22F 1/02* (2013.01); *B22F 1/0018* (2013.01); *B22F 2301/25* (2013.01); *B22F 2304/054* (2013.01); *B82Y 20/00* (2013.01); *B82Y 40/00* (2013.01); *Y10S 977/774* (2013.01); *Y10S 977/813* (2013.01); *Y10S 977/815* (2013.01); *Y10S 977/824* (2013.01); *Y10S 977/892* (2013.01); *Y10S 977/95* (2013.01)

(58) Field of Classification Search
CPC .............. C09K 11/703; Y10S 977/774; Y10S 977/815; Y10S 977/824; Y10S 977/813
See application file for complete search history.

(56) References Cited

U.S. PATENT DOCUMENTS

| 7,588,828 | B2 | 9/2009 | Mushtaq et al. | |
|---|---|---|---|---|
| 7,867,557 | B2 | 1/2011 | Pickett et al. | |
| 8,685,841 | B2* | 4/2014 | Zhang | H01L 21/02425 257/12 |
| 8,957,182 | B2 | 2/2015 | Lee et al. | |
| 9,295,654 | B2 | 3/2016 | Barbe et al. | |
| 9,304,124 | B2 | 4/2016 | Medintz et al. | |
| 9,343,301 | B2 | 5/2016 | Harris et al. | |
| 2008/0095852 | A1 | 4/2008 | Kong et al. | |
| 2010/0183504 | A1 | 7/2010 | Chen | |
| 2014/0264172 | A1 | 9/2014 | Daniels et al. | |
| 2014/0370690 | A1 | 12/2014 | Harris et al. | |
| 2015/0001588 | A1 | 1/2015 | Gunji et al. | |
| 2015/0014586 | A1 | 1/2015 | Liu et al. | |
| 2016/0175254 | A1* | 6/2016 | Revaprasadu | A61K 47/6923 424/490 |

FOREIGN PATENT DOCUMENTS

| CN | 101151052 A | 3/2008 |
|---|---|---|
| CN | 102559190 A | 7/2012 |
| CN | 105378027 A | 3/2016 |
| CN | 105548108 A | 5/2016 |
| TW | I253480 B | 4/2006 |
| TW | I392869 B1 | 4/2013 |
| TW | I415981 B | 11/2013 |
| TW | 201500275 A | 1/2015 |
| TW | 201502238 A | 1/2015 |
| TW | I518190 B | 1/2016 |
| TW | I537206 B | 6/2016 |
| TW | 201639778 A | 11/2016 |
| WO | 2009/045579 A2 | 4/2009 |
| WO | 2013/173409 A1 | 11/2013 |
| WO | 2014/141662 A1 | 9/2014 |

OTHER PUBLICATIONS

Scott, R.W.J., et al, "Synthesis, Characterization, and Stability of Dendrimer-Encapsulated Palladium Nanoparticles", Chem, Mater., Sep. 4, 2003, vol. 15, pp. 3873-3878.
Shen, L., et al, "Growth and Stabilization of Silver Nanoparticles on Carbon Dots and Sensing Application", Langmuir, Dec. 6, 2013, vol. 29, pp. 16135-16140.
Taiwanese Office Action for Appl. No. 106138600 dated Jun. 27, 2018.
Tang, R., et al, "Tunable Ultrasmall Visible-to-Extended Near-Infrared Emitting Silver Sulfide Quantum Dots for Integrin-Targeted Cancer Imaging", ACS Nano, Jan. 5, 2015, vol. 9, No. 1, pp. 220-230.
Pickett et al.; "Commercial Volumes of Quantum Dots: Controlled Nanoscale Synthesis and Micron-Scale Applications," Material Matters, vol. 3, Article 1, 2008, pp. 24 (4 pages total).
Suh et al., "Nanoparticle Growth Analysis by Molecular Dynamics: Cubic Seed," J. Phys. Chem. B, vol. 116, Nov. 7, 2012, pp. 14637-14649.

(Continued)

*Primary Examiner* — C Melissa Koslow
(74) *Attorney, Agent, or Firm* — Birch, Stewart, Kolasch & Birch, LLP (57) ABSTRACT

A method for manufacturing a quantum dot and a quantum dot are provided. The method includes adding a core semiconductor precursor solution into a seed composition solution. The seed composition solution includes a seed composition, and the seed composition is a dendrimer-metal nanoparticle composite. The core semiconductor precursor solution includes a first semiconductor ion and a second semiconductor ion. The method also includes carrying out a first synthesis reaction to form a core semiconductor material wrapping the seed composition. The core semiconductor material is formed by combining the first semiconductor ion with the second semiconductor ion.

15 Claims, 3 Drawing Sheets

(56) References Cited

OTHER PUBLICATIONS

Talapin et al., "Seeded Growth of Highly Luminescent CdSe/CdS Nanoheterostructures with Rod and Tetrapod Morphologies," Nano Letters, vol. 7, No. 10, 2007 (published on web Sep. 11, 2007), pp. 2951-2959.

Wang et al., "The Magic-Size Nanocluster $(CdSe)_{34}$ as a Low-Temperature Nucleant for Cadmium Selenide Nanocrystals; Room-Temperature Growth of Crystalline Quantum Platelets," Chem. Mater., vol. 26, Mar. 6, 2014, pp. 2233-2243.

\* cited by examiner

QUANTUM DOT AND METHOD FOR MANUFACTURING THE SAME

CROSS REFERENCE TO RELATED APPLICATIONS

This application claims the benefit of U.S. Provisional Application No. 62/419,044, filed on Nov. 8, 2016, which is incorporated herein by reference.

TECHNICAL FIELD

The present disclosure relates to a quantum dot and a method for manufacturing the quantum dot, and in particular it relates to a method for manufacturing quantum dots at a lower reaction temperature.

BACKGROUND

Quantum dots (QDs) are nanoscale semiconductor materials that typically have a crystalline structure formed from several hundred atoms to several thousand atoms. Quantum dots have photoluminescent properties. Compared with conventional organic dye molecules, the advantages of quantum dots include: higher fluorescent brightness, better stability and adjustable fluorescence wavelength.

Quantum dots are highly promising materials and are applicable in a wide range of applications such as laser components, photosensing components, memory components, solar photovoltaic components, display components, biological detection components, and the like.

However, quantum dots are expensive and difficult to mass produce, limiting their potential to be used in various industries. In addition, most existing quantum dots are cadmium-containing materials that are highly polluting to the environment. Based on environmentally friendly considerations, cadmium-free quantum dots have become the mainstream of research.

Therefore, in order to achieve efficient production of cadmium-free quantum dots, there is still demand for a better manufacturing method.

SUMMARY

One embodiment of the disclosure discloses a method for manufacturing a quantum dot, including: (a) providing a seed composition solution, wherein the seed composition solution includes a seed composition, and the seed composition is a dendrimer-metal nanoparticle composite; (b) adding a core semiconductor precursor solution into the seed composition solution, wherein the core semiconductor precursor solution includes a first semiconductor ion and a second semiconductor ion; and (c) performing a first synthesis reaction to form a core semiconductor material wrapping the seed composition, wherein the core semiconductor material is formed by combining the first semiconductor ion with the second semiconductor ion.

Another embodiment of the disclosure discloses a quantum dot, including: a seed, wherein the seed includes a metal nanoparticle, and the metal nanoparticle includes gold, silver, platinum or palladium; and a core semiconductor material wrapping the seed, wherein the core semiconductor material is formed by combining a first semiconductor ion with a second semiconductor ion.

A detailed description is given in the following embodiments with reference to the accompanying drawings.

BRIEF DESCRIPTION OF DRAWINGS

The present disclosure can be more fully understood by reading the subsequent detailed description and examples with references made to the accompanying drawings, wherein.

DETAILED DESCRIPTION

In the disclosure, the term "about" or "approximately" means in a range of 20% of a given value or range, preferably 10%, and more preferably 5%. In the disclosure, if there is no specific explanation, a given value or range means an approximate value which may imply the meaning of "about" or "approximately".

In accordance with some embodiments of the disclosure, a method for manufacturing the quantum dots is provided, and the manufacturing method uses dendrimer-metal nanoparticle composite as the seed composition to perform the synthesis reaction of the quantum dots. The dispersibility and chemical stability of the seed composition in the reaction solution are good, and the attraction between the seed composition and the precursor of the quantum dots is good. By using the seed composition, the reaction temperature of the synthesis reaction of the quantum dots can be reduced and the process window of the synthesis reaction of the quantum dots can be improved. Therefore, the quantum dots can be manufactured with high efficiency by using this manufacturing method, and the time and cost for manufacturing the quantum dots can be reduced.

In some embodiments of the disclosure, a method for manufacturing the quantum dots is provided, and the method includes the following steps:

(a) providing a seed composition solution, wherein the seed composition solution includes a seed composition, and the seed composition is a dendrimer-metal nanoparticle composite;

(b) adding a core semiconductor precursor solution into the seed composition solution, wherein the core semiconductor precursor solution includes a first semiconductor ion and a second semiconductor ion; and (c) performing a first synthesis reaction to form a core semiconductor material wrapping the seed composition, wherein the core semiconductor material is formed by combining the first semiconductor ion with the second semiconductor ion.

The step (a) of the method for manufacturing the quantum dots will be described in detail below with reference to FIG. 1.

Figure 1:
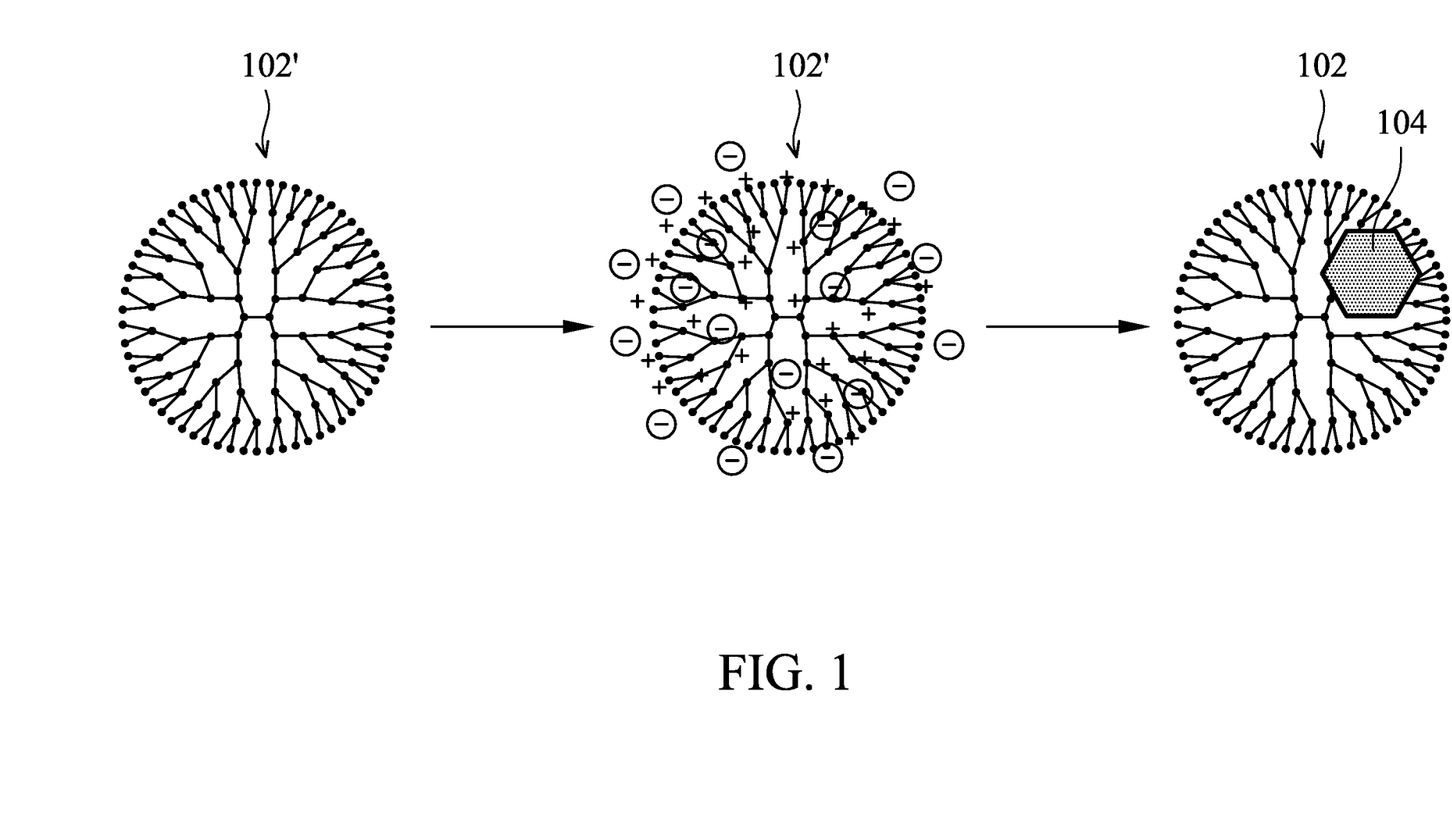
FIG. 1 shows a schematic diagram of steps for preparing a seed composition in accordance with some embodiments of the disclosure.

FIG. 1 shows a schematic diagram of steps for preparing a seed composition 102 in accordance with some embodiments of the disclosure. Referring to FIG. 1, a seed composition solution is provided firstly. The seed composition solution includes a dendrimer 102', a metal salt compound and a solvent. The structure of the dendrimer 102' is shown in the left of FIG. 1.

The metal salt is dissolved in the solvent, and metal ions and their counter ions are produced. The electrical property of the metal ions and the electrical property of the counter ions are opposite to each other. The metal ions produced from the dissolved metal salt are attracted to the functional groups in the dendrimer 102' and are dispersed in the dendrimer 102'. In addition, the counter ions are also dispersed in the dendrimer 102' in order to balance the charge. The state where the metal ions and the counter ions are adsorbed to the dendrimer 102' is shown in the middle of FIG. 1.

Then, appropriate energy is provided to the dendrimer 102' adsorbed with the metal ions and the counter ions, and the metal ions undergo the reduction reaction to form metal atoms. The produced metal atoms are aggregated in the dendrimer 102' to form a metal nanoparticle 104. Therefore, the seed composition solution including the seed composition 102 may be obtained. The seed composition 102 is a dendrimer-metal nanoparticle composite, and its structure is shown in the right of FIG. 1.

Methods of providing appropriate energy may include, but are not limited to, irradiating the seed composition solution with light. Due to the different energy required for the reduction reaction of the different metal ions, the light having an appropriate wavelength may be selected depending on the metal ions used. In some embodiments, in order to obtain the seed composition 102, the seed composition solution may be irradiated with ultraviolet light having a wavelength of 200 to 350 nm. In other embodiments, the seed composition solution may be irradiated with the light having other wavelength.

The dendrimer 102' may be used as a template for the synthesis of the metal nanoparticle 104. As shown in FIG. 1, the dendrimer 102' has a well-controlled three-dimensional structure. The dendrimer 102' has the functional groups capable of attracting the metal ions at the ends of its molecular chain, and thus it can effectively adsorb the metal ions. Therefore, an appropriate dendrimer 102' may be selected according to the desired metal nanoparticle 104 to be synthesized. For example, the appropriate dendrimer 102' may include, but is not limited to, polyamidoamine (PAMAM) or polypropylenimine (PPI). In some embodiments, the dendrimer 102' is the polyamidoamine dendrimer. In such embodiments, the amino groups at the ends of the molecular chain of the dendrimer 102' may act as the functional groups that attract the metal ions.

Furthermore, in order to control the particle diameter and the uniformity of the particle diameter of the metal nanoparticles 104, the ratio $X1/X2$ of the number of moles $X1$ of the functional groups of the dendrimer 102' to the number of moles $X2$ of the metal nanoparticle 104 may be adjusted within a specific range.

If the ratio $X1/X2$ is too low, the attraction of the dendrimer 102' for the metal ions is too weak to adsorb a sufficient amount of metal ions. As a result, the particle diameter of the metal nanoparticle 104 may be too small to be used as a seed, and it is disadvantageous for the subsequent synthesis reaction of the quantum dots. On the other hand, if the ratio $X1/X2$ is too high, the metal ions adsorbed by the dendrimer 102' are too much. As a result, the particle diameter of the metal nanoparticle 104 may be too large, or a plurality of metal nanoparticles 104 may be wrapped by a single dendrimer 102'. As a result, the particle diameters of the metal nanoparticles 104 may be too large or non-uniform, and thus the quantum dots having a uniform particle diameter cannot be obtained.

In some embodiments, the ratio $X1/X2$ of the number of moles $X1$ of the functional groups of the dendrimer 102' to the number of moles $X2$ of the metal nanoparticle 104 is 1-5. In other embodiments, the ratio $X1/X2$ is 1-4. In yet other embodiments, the ratio $X1/X2$ is 2-3.

In addition, the molecular arrangement of the outer portion of the dendrimer 102' is looser than that of the inner portion. Therefore, the outer portion of the dendrimer 102' has a space that can accommodate the metal nanoparticle 104. In addition, due to the steric hindrance of the dendrimer 102', the excessively large particle diameter of the metal nanoparticle 104 can be avoided. Since the dendrimer 102' having a different generation number has a different steric hindrance, the particle diameter of the metal nanoparticle 104 can be controlled to within a desired range by selecting the dendrimer 102' having an appropriate generation number.

If the generation number of the dendrimer 102' is higher, the space for forming the metal nanoparticle 104 is smaller. Therefore, if the generation number of the dendrimer 102' is higher, the particle diameter of the resulted metal nanoparticle 104 is smaller. Furthermore, if the generation number of the dendrimer 102' is higher, it is easier to form a single metal nanoparticle 104 wrapped by a single dendrimer 102'.

If the dendrimer 102' having the generation number equal to or smaller than 3 generation is used, the particle diameter of the resulted metal nanoparticle 104 may be too large and the particle diameter of the subsequently formed quantum dots may be too large. Furthermore, if the dendrimer 102' having the generation number equal to or smaller than 3 generation is used, it may happen that a single metal nanoparticle 104 is wrapped by a plurality of dendrimers 102', or a plurality of metal nanoparticles 104 are wrapped by a single dendrimer 102'. As a result, the particle diameters of the metal nanoparticles 104 used as the seed may be non-uniform, and thus the quantum dots having a uniform particle diameter cannot be obtained. In some embodiments, in order to form the desired seed composition well, the dendrimer 102' having the generation number equal to or greater than 4.0 generation is used.

The upper limit of the generation number of the dendrimer 102' is not particularly limited. However, in order to form the metal nanoparticle 104 easily and to reduce the cost, the dendrimer 102' having the generation number equal to or smaller than 8.0 generation may be used. In some embodiments, the dendrimer 102' having the generation number equal to or smaller than 6.0 generation is used. In other embodiments, the dendrimer 102' having the generation number equal to or smaller than 5.0 generation is used.

The metal salt compound may serve as a source of metal ions for the metal nanoparticles 104. In this specification, the term of "metal ion" includes a cation formed of only a metal, a cation formed of a metal and a ligand, or an anion formed of a metal and a ligand.

In the subsequent first synthesis reaction, the first semiconductor ions and the second semiconductor ions react on the surface of the metal nanoparticle 104 to form a core semiconductor material. If the crystal phase of the metal nanoparticle 104 is incompatible with the crystal phase of the core semiconductor material, it is difficult to form the core semiconductor material on the surface of the metal nanoparticle 104. In other words, the reactivity of the synthesis reaction of the core semiconductor material is poor, resulting in a decrease in production efficiency and an increase in production cost. In addition, if the crystal phase of the metal nanoparticle 104 is incompatible with the crystal phase of the core semiconductor material, the quantum efficiency and the stability of the generated quantum dots are not good. In some embodiments, in order to enhance the reactivity of the synthesis reaction of the core semiconductor material, the crystal phase of the metal nanoparticles 104 is compatible with the crystal phase of the core semiconductor material. Furthermore, if the crystal phase of the metal nanoparticle 104 is the same as the crystal phase of the core semiconductor material, the formation of the core semiconductor material may be more favorable, i.e., using milder reaction conditions (for example, lower reaction temperature) for the synthesis reaction of the core semiconductor materials.

For example, the crystal phase of the metal nanoparticle 104 and the crystal phase of the core semiconductor material may independently include, but is not limited to, cubic phase or hexagonal phase. In some embodiments, the crystal phase of the metal nanoparticle 104 is cubic phase, and the crystal phase of the core semiconductor material is also cubic phase.

The crystal phase of the metal nanoparticle 104 may depend on the material of the metal nanoparticle 104. In some embodiments, the metal nanoparticle 104 is formed by at least one metal material, and the appropriate metal material includes gold, silver, platinum, palladium or other appropriate metal. In other embodiments, the metal nanoparticle 104 is formed by a single metal material, and the appropriate metal material is selected from the group consisting of gold, silver, platinum and palladium. In some embodiments, the metal nanoparticle 104 is a gold nanoparticle.

According to the material of the metal nanoparticle 104, an appropriate metal salt compound may be used. In some embodiments, the metal salt compound may include, but is not limited to, chloroauric acid ($HAuCl_4$), silver nitrate ($AgNO_3$), potassium tetrachloroplatinate ($K_2PtCl_4$), disodium tetrachloropalladate ($Na_2PdCl_4$).

In addition, if the average particle diameter of the metal nanoparticle 104 is too small, it cannot be used as a seed. Therefore, the reaction temperature of the synthesis reaction of the quantum dots cannot be reduced, and the process window of the synthesis reaction cannot be improved. On the other hand, if the average particle diameter of the metal nanoparticle 104 is too large, the particle diameter of the subsequently synthesized quantum dots will also be too large. Therefore, it is difficult to adjust the particle diameter of the quantum dots to the desired range.

Therefore, in order to synthesize the desired quantum dots, the average particle diameter of the metal nanoparticle 104 may be controlled to within a specific range. For example, average particle diameter of the metal nanoparticle 104 may be less than or equal to 2 nm. In some embodiments, the average particle diameter of the metal nanoparticles 104 is 0.5-2 nm. In other embodiments, the average particle diameter of the metal nanoparticles 104 is 0.8-1.6 nm. In yet other embodiments, the average particle diameter of the metal nanoparticles 104 is 1.0-1.4 nm In order to form the seed composition 102 efficiently, a solvent in which the dendrimer 102' and the metal salt compound have good solubility may be used. Appropriate solvents may be polar solvents. For example, the solvent of the seed composition solution may include, but is not limited to, water, methanol, ethanol, or a combination thereof. In some embodiments, the solvent of the seed composition solution is water.

The steps (b) and (c) of the method for manufacturing the quantum dots will be described in detail below with reference to FIG. 2.

Figure 2:
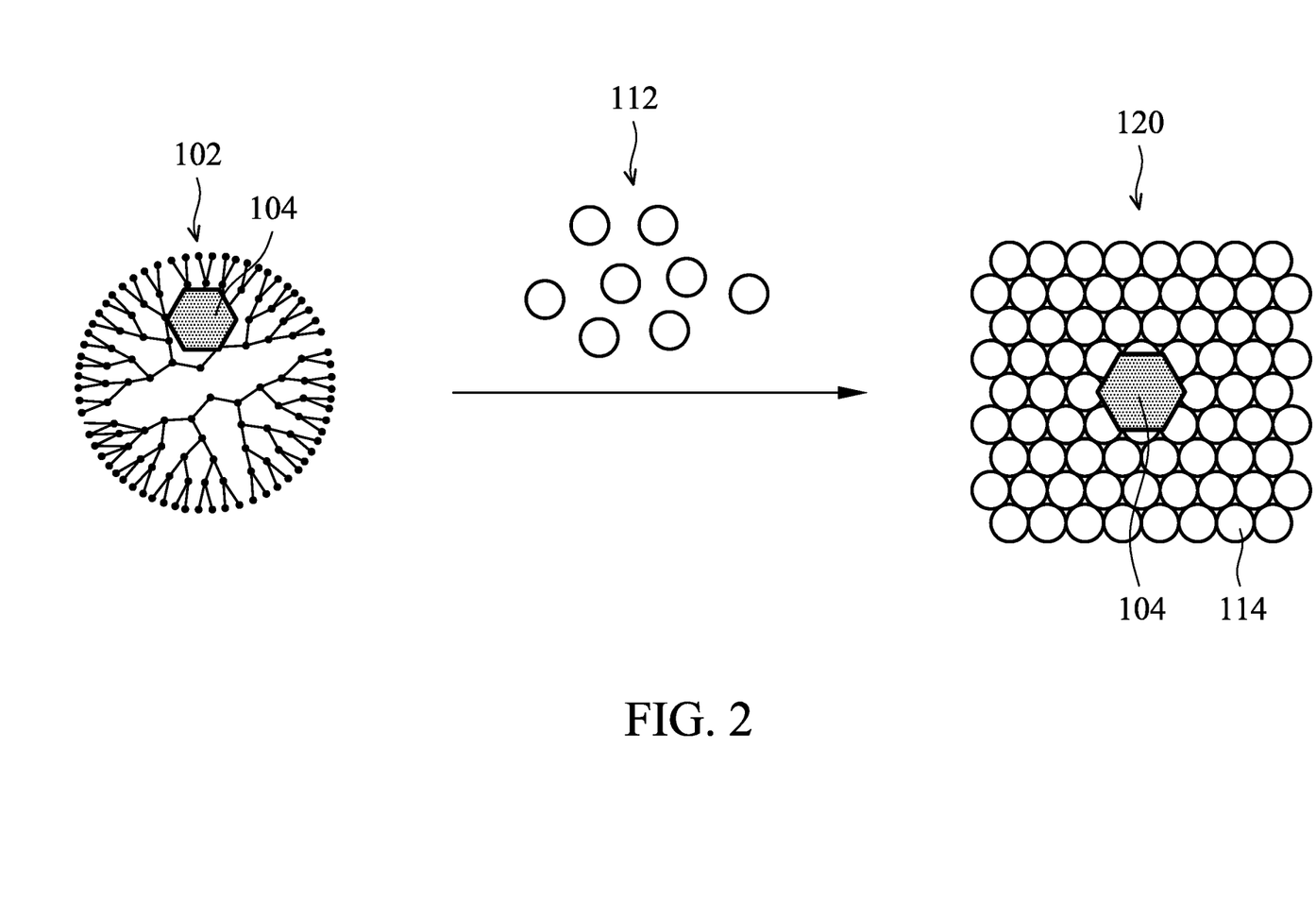
FIG. 2 shows a schematic diagram of steps for the manufacturing quantum dots in accordance with some embodiments of the disclosure.

FIG. 2 shows a schematic diagram of steps for manufacturing the quantum dot 120 in accordance with some embodiments of the disclosure. Referring to FIG. 2, a seed composition solution including the seed composition 102 is provided first. As described above, the seed composition 102 is formed by wrapping the dendrimer 102' around the metal nanoparticle 104. The structure of the seed composition 102 is shown in the left of FIG. 2.

In the step (b), a core semiconductor precursor solution is added into the seed composition solution, and the core semiconductor precursor solution includes a core semiconductor precursor 112. In order to simplify the description, only the core semiconductor precursor 112 is shown in FIG. 2. In fact, the core semiconductor precursor 112 may include a precursor of the first semiconductor ions and a precursor of the second semiconductor ions. After receiving the appropriate energy (for example, optical energy or thermal energy), the precursor of the first semiconductor ion may generate the first semiconductor ions, and the precursor of the second semiconductor ion may generate the second semiconductor ions.

In some embodiments, the first semiconductor ion is a cation, and the second semiconductor ion is an anion. However, this is only for the purpose of illustration and is not intended to be limiting. In other embodiments, the first semiconductor ion is an anion, and the second semiconductor ion is a cation.

In the step (c), the first synthesis reaction is performed for combining the first semiconductor ion with the second semiconductor ion to form the core semiconductor material 114, and the seed composition 102 is wrapped by the core semiconductor material 114 to form the quantum dot 120. The structure of the quantum dot 120 is shown in the right of FIG. 2.

The first synthesis reaction is carried out at a high temperature (for example, over 100° C.). During the first synthesis reaction, the organic component (i.e., the dendrimer 102') in the seed composition 102 is decomposed by heat. Therefore, in the resulted quantum dot 120, the dendrimer 102' does not exist in the core semiconductor material 114. In other words, the quantum dot 120 is formed by wrapping the core semiconductor material 114 around the seed (i.e., the metal nanoparticle 104), as shown in FIG. 2.

An appropriate core semiconductor precursor 112 may be used according to the quantum dot 120 to be synthesized. The core semiconductor material 114 used to form the quantum dot 120 may include a Group II/VI compound, a Group III/V compound or a Group IV/VI compound.

In some embodiments, the first semiconductor ion is a cation, and it may include, but is not limited to, zinc ion, boron ion, aluminum ion, gallium ion, indium ion, thallium ion, silicon ion, or germanium ion. In such embodiments, the precursor of the first semiconductor ion may be an organometallic compound, a coordination compound, an inorganic salt, other appropriate precursors, or a combination thereof. For example, if the first semiconductor ion is indium ion, the precursor of the first semiconductor ion may be indium chloride ($InCl_3$).

In some embodiments, the second semiconductor ion is an anion, and it may include, but is not limited to, nitrogen ion, phosphorus ion, arsenic ion, antimony ion, sulfide ion, selenium ion, tellurium ion, or tin ion. In such embodiments, the precursor of the second semiconductor ion may be an organometallic compound, a coordination compound, an inorganic salt, other appropriate precursors, or a combination thereof. For example, if the second semiconductor ion is phosphorus ion, the precursor of the second semiconductor ion may be tris(dimethylamino)phosphine ($P(N(CH_3)_2)_3$).

More specifically, the first synthesis reaction includes generating the first semiconductor ions and the second semiconductor ions by the core semiconductor precursor 112. Then, by using the dendrimer-metal nanoparticle composite (i.e., the seed composition 102) as the seed, the first semiconductor ions and the second semiconductor ions are reacted on the surface of the metal nanoparticle 104, and the core semiconductor material 114 wrapping the metal nanoparticle 104 (i.e., the quantum dot 120) is formed. After the first synthesis reaction is continued for a period of time, the quantum dots 120 are stopped from growing by cooling or adding a surface modifier.

According to some embodiments of the disclosure, a dendrimer-metal nanoparticle composite is used as the seed. Because the functional groups of the dendrimer are attractive to the first semiconductor ions (or the second semiconductor ions), the first semiconductor ions may be collected in the vicinity of the metal nanoparticles. Furthermore, because the functional groups of the dendrimer can enhance the affinity between the metal nanoparticles and the core semiconductor precursors, the energy barrier of heterogeneous nucleation is reduced. Therefore, even if the reaction temperature of the first synthesis reaction is low, the first semiconductor ions and the second semiconductor ions can react on the surface of the metal nanoparticle 104 to form the quantum dots. In other words, the seed composition of the disclosure can significantly reduce the reaction temperature of the first synthesis reaction.

In some embodiments, the reaction temperature of the first synthesis reaction is 170-190° C. In other embodiments, the reaction temperature of the first synthesis reaction is 175-185° C. In yet other embodiments, the reaction temperature of the first synthesis reaction is 180° C.

In contrast, if the first synthesis reaction is performed directly without using the seed, or the first synthesis reaction is performed using the seed which does not include the dendrimer, a higher reaction temperature (for example, equal to or greater than 200° C.) is needed. In such a case, when the reaction temperature of the first synthesis reaction is about 170° C., it may not be able to form the quantum dots.

If the first synthesis reaction is performed directly without using the seed, the reaction rate of the first synthesis reaction is extremely high due to the high reaction temperature (for example, equal to or greater than 200° C.). In other words, all the quantum dots will be formed within a very short time (for example, less than 60 seconds). In such a case, it is difficult to control the uniformity of the particle diameter of the quantum dots. In particular, when a large number of quantum dots are synthesized, it is difficult to make the temperature of the reactor uniform over such a short period of time. In other words, the temperatures are different at different locations of the reactor, and the particle diameters of the synthesized quantum dots are also different. As a result, the problem of heterogeneity in particle diameter will be exacerbated. Furthermore, because the reaction time of the quantum dots is too short (i.e., the process window is too small), it is difficult to control or to perform subsequent processes (for example, forming the shell).

On the other hand, if the process window of the synthesis reaction of the quantum dots is too large, it will take too much time to form the quantum dots. As a result, the production efficiency of the quantum dots will be significantly reduced.

In contrast, because the seed composition of the disclosure can significantly reduce the reaction temperature of the first synthesis reaction, the reaction rate is also moderately reduced. In other words, by using the seed composition of the disclosure, the process window of the synthesis reaction of the quantum dots can be controlled to within an appropriate range, so that the balance between the production efficiency and the process operability can be achieved.

In some embodiments, the reaction time of the first synthesis reaction is 90-300 seconds. In other embodiments, the reaction time of the first synthesis reaction is 120-240 seconds. In yet other embodiments, the reaction time of the first synthesis reaction is 150-180 seconds.

In addition, because the dendrimer has functional groups at its surface, the dispersibility and stability of the metal nanoparticles in the solvent can be improved, and the aggregation of the metal nanoparticles can be avoided. Therefore, the seeds of the seed composition of the disclosure may keep reactivity even if they are stored for a period of time (for example, several days) after being synthesized. In other words, the flexibility of the process is great.

In contrast, because the inorganic seeds have poor preservability, they will decompose and lose their reactivity in a short time after being synthesized. Therefore, an inorganic seed like this must be used immediately after synthesis, and a high proportion of seed may lose its activity. The flexibility of the process is small, and the economic benefit is not good.

In addition, the quantum dots have photoluminescent properties. When a quantum dot absorbs light having the higher energy, its electrons are excited from a low-energy state to a high-energy state. Then, when the excited electrons return from the high-energy state to the low-energy state, the fluorescence having the lower energy will be emitted.

The wavelength of the fluorescence emitted by the quantum dots varies with the composition of the quantum dots. Furthermore, for the quantum dots formed from the same material, if the particle diameter of the quantum dot is smaller, the bandgap of the quantum dot is larger. In other words, the wavelength of the fluorescence emitted by the quantum dots also varies with the particle diameter of the quantum dots. Therefore, by controlling the composition and particle diameter of the quantum dots, it is possible to adjust the light emission characteristics of the quantum dots.

Because the dendrimer is a well-controlled structure, the particle diameter or the crystal phase of the metal nanoparticles can be controlled easily. Therefore, the seed composition of the disclosure can effectively control the particle diameter of the quantum dots and achieve good uniformity of the particle diameter of the quantum dots. As a result, the quantum dots capable of emitting light of a desired wavelength can be easily synthesized, and the quantum dots having a narrow emission wavelength range can also be formed.

After the formation of the quantum dots described above, the quantum dots may be subjected to other processes optionally. For example, a shell may be formed on the surface of the core semiconductor material to form the quantum dot having a core-shell structure.

In some embodiments of the disclosure, a method for manufacturing the quantum dots is provided, and the method includes the following steps:

(d) after forming the core semiconductor material, adding a shell semiconductor precursor solution, wherein the shell semiconductor precursor solution includes a third semiconductor ion and a fourth semiconductor ion; and (e) performing a second synthesis reaction to form a shell semiconductor material wrapping the core semiconductor material, wherein the shell semiconductor material is formed by combining the third semiconductor ion with the fourth semiconductor ion.

The steps (d) and (e) of the method for manufacturing the quantum dots will be described in detail below with reference to FIG. 3.

Figure 3:
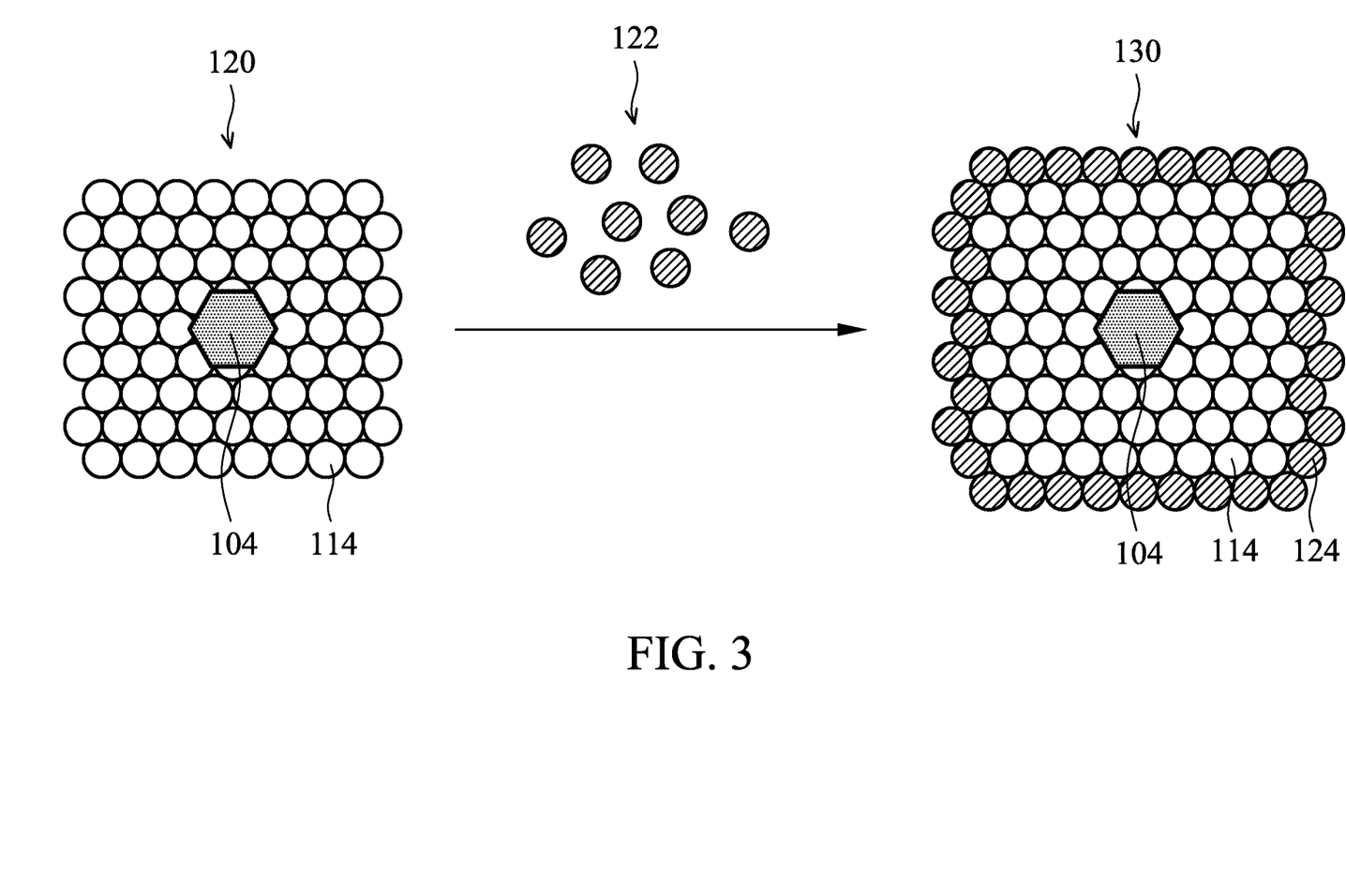
FIG. 3 shows a schematic diagram of steps for manufacturing the quantum dots having a core-shell structure in accordance with some embodiments of the disclosure.

FIG. 3 shows a schematic diagram of steps for manufacturing the quantum dot 300 having a core-shell structure in accordance with some embodiments of the disclosure. Referring to FIG. 3, the quantum dot 120 is provided first. As described above, the quantum dot 120 is formed by wrapping the core semiconductor material 114 around the metal nanoparticle 104. The structure of the quantum dot 120 is shown in the left of FIG. 3.

In the step (e), after forming the core semiconductor material, a shell semiconductor precursor solution is added, and the shell semiconductor precursor solution includes a shell semiconductor precursor 122. In order to simplify the description, only the shell semiconductor precursor 122 is shown in FIG. 3. Similarly, the shell semiconductor precursor 122 may include a precursor of the third semiconductor ions and a precursor of the fourth semiconductor ions. After receiving the appropriate energy (for example, optical energy or thermal energy), the precursor of the third semiconductor ion may generate the third semiconductor ions, and the precursor of the fourth semiconductor ion may generate the fourth semiconductor ions.

In some embodiments, the third semiconductor ion is a cation, and the fourth semiconductor ion is an anion. However, this is only for the purpose of illustration and is not intended to be limiting. In other embodiments, the third semiconductor ion is an anion, and the fourth semiconductor ion is a cation.

In the step (e), the second synthesis reaction is performed for combining the third semiconductor ion with the fourth semiconductor ion to form the shell semiconductor material 124, and the core semiconductor material 114 and the seed composition 102 are wrapped by the shell semiconductor material 124 to form the quantum dot 130. The structure of the quantum dot 130 is shown in the right of FIG. 3.

By selecting the shell semiconductor material 124, it is possible to control the bandgap of the quantum dot 130 and to adjust the light emission characteristics of the quantum dot 130. In some embodiments, the bandgap of the core semiconductor material 114 is wider than the bandgap of the shell semiconductor material 124. In other embodiments, the bandgap of the core semiconductor material 114 is narrower than the bandgap of the shell semiconductor material 124.

In the second synthesis reaction, if the crystal phase of the shell semiconductor material 124 is incompatible with the crystal phase of the core semiconductor material 114, it is difficult to form the shell semiconductor material 124 on the surface of the core semiconductor material 114. In other words, the reactivity of the synthesis reaction of the shell semiconductor material 124 is poor, resulting in a decrease in production efficiency and an increase in production cost.

In some embodiments, in order to enhance the reactivity of the second synthesis reaction, the crystal phase of the shell semiconductor material 124 is compatible with the crystal phase of the core semiconductor material 114. For example, the crystal phase of the shell semiconductor material 124 and the crystal phase of the core semiconductor material 114 may independently include, but is not limited to, cubic phase or hexagonal phase. In some embodiments, the crystal phase of the core semiconductor material 114 is cubic phase, and the crystal phase of the shell semiconductor material 124 is cubic phase.

An appropriate shell semiconductor precursor 122 may be used according to the quantum dot 130 to be synthesized. The shell semiconductor material 124 used to form the quantum dot 130 may include a Group II/VI compound, a Group III/V compound or a Group IV/VI compound.

In some embodiments, the third semiconductor ion is a cation, and it may include, but is not limited to, zinc ion, boron ion, aluminum ion, gallium ion, indium ion, thallium ion, silicon ion, or germanium ion. In such embodiments, the precursor of the third semiconductor ion may be an organometallic compound, a coordination compound, an inorganic salt, other appropriate precursors, or a combination thereof. For example, if the third semiconductor ion is zinc ion, the precursor of the third semiconductor ion may be zinc stearate ($Zn(C_{17}H_{35}COO)_2$).

In some embodiments, the fourth semiconductor ion is an anion, and it may include, but is not limited to, nitrogen ion, phosphorus ion, arsenic ion, antimony ion, sulfide ion, selenium ion, tellurium ion, or tin ion. In such embodiments, the precursor of the fourth semiconductor ion may be an organometallic compound, a coordination compound, an inorganic salt, other appropriate precursors, or a combination thereof. For example, if the fourth semiconductor ion is sulfide ion, the precursor of the fourth semiconductor ion may be n-dodecyl thiol ($C_{12}H_{26}S$).

More specifically, the second synthesis reaction includes generating the third semiconductor ions and the fourth semiconductor ions by the shell semiconductor precursor 122. Then, the third semiconductor ions and the fourth semiconductor ions are reacted on the surface of the core semiconductor material 114, and the quantum dot 130 having the core-shell structure is formed. After the second synthesis reaction is continued for a period of time, the quantum dots 130 are stopped from growing by cooling or adding a surface modifier.

The seeds have been wrapped by the core semiconductor material. Therefore, the seeds will be not decomposed even If the reaction temperature is increased. Furthermore, the reaction time of the second synthesis reaction can be shortened by increasing the reaction temperature, and the production efficiency of the quantum dots can be improved. In some embodiments, the reaction temperature of the second synthesis reaction is 200-300° C. In some embodiments, the reaction time of the second synthesis reaction is 3-6 hours.

In other embodiments of the disclosure, a quantum dot is provided. Referring to FIG. 2, the quantum dot 120 includes a seed and a core semiconductor material 114 wrapping the seed. The seed includes a metal nanoparticle 104, and the metal nanoparticle 104 includes gold, silver, platinum or palladium. The core semiconductor material 114 is formed by combining a first semiconductor ion with a second semiconductor ion.

In other embodiments of the disclosure, a quantum dot having a core-shell structure is provided. Referring to FIG. 3, the quantum dot 130 includes a seed, a core semiconductor material 114 wrapping the seed, and a shell semiconductor material 124 wrapping the core semiconductor material 114. The shell semiconductor material 124 is formed by combining a third semiconductor ion with a fourth semiconductor ion.

The quantum dots 120 and the quantum dots 130 are prepared by the above-mentioned methods. As described above, the advantages of the quantum dots 120 and the quantum dots 130 includes good uniformity of the particle diameter, high production efficiency, and low production cost.

The quantum dots and the method for manufacturing the quantum dots will be described in detail with reference to the following examples. In the following examples, all chemicals were bought from Sigma-Aldrich.

In this specification, the PAMAM dendrimer-Au nanoparticle is taken as an exemplary example to illustrate the preparation of the dendrimer-metal nanoparticle composite.

[Preparation Example 1] the Preparation of the PAMAM Dendrimer-Au Nanoparticle Composite (I)

The methanol solution of the polyamidoamine (PAMAM) dendrimer having the generation number equal to 4.0 generation (weight average molecular weight: 14215 Da, Sigma-Aldrich) was prepared. The methanol in the solution was removed by distillation under reduced pressure, and the PAMAM dendrimer was dissolved in water to prepare a PAMAM dendrimer aqueous solution with a concentration of $6.24 \times 10^{-6}$ M. Tetrachloroauric acid ($HAuCl_4$) was dissolved in water to prepare a $HAuCl_4$ aqueous solution with a concentration of $0.2 \times 10^{-3}$ M. The number of moles of the functional groups (i.e., the amino group) of the PAMAM dendrimer is set as X1, and the number of moles of the $HAuCl_4$ is set as X2. The PAMAM aqueous solution was mixed with the $HAuCl_4$ aqueous solution in such a manner that the ratio X1/X2 was equal to 4. The mixed solution was put into a transparent quartz container and irradiated with a 50 W low-pressure mercury lamp (light wavelength: 254 nm) in a dark box at room temperature for 8 hours. The seed composition solution containing the PAMAM dendrimer-Au nanoparticle composite (I) was obtained.

[Preparation Example 2] The Preparation of the PAMAM Dendrimer-Au Nanoparticle Composite (II)

The same steps as described in Preparation Example 1 were performed except that the methanol solution of the PAMAM dendrimer having the generation number equal to 4.0 generation was replaced by the methanol solution of the PAMAM dendrimer having the generation number equal to 5.0 generation (weight average molecular weight: 28824 Da, Sigma-Aldrich). Then, the seed composition solution containing the PAMAM dendrimer-Au nanoparticle composite (II) was obtained.

[Measurements of the Physical Properties of the Au Nanoparticle]

The PAMAM dendrimer-Au nanoparticle composites obtained in Preparation Example 1 and Preparation Example 2 were analyzed by the energy dispersive X-ray spectroscopy (EDS). It was confirmed that the components of all the nanoparticles obtained in Preparation Example 1 and Preparation Example 2 were gold.

The PAMAM dendrimer-Au nanoparticle composites obtained in Preparation Example 1 and Preparation Example 2 were analyzed by the X-ray diffractometer (XRD). It was confirmed that the crystal phase of all the nanoparticles obtained in Preparation Example 1 and Preparation Example 2 were FCC cubic structure and were classified under the Fm3m-based crystal phase, and the lattice size was about 0.2 nm.

The PAMAM dendrimer-Au nanoparticle composites obtained in Preparation Example 1 and Preparation Example 2 were analyzed by the ultraviolet/visible absorption spectrometer. It was confirmed that the Au nanoparticles obtained in Preparation Example 1 have strong absorption peaks at about 300 nm and about 510 nm, respectively. It was confirmed that the Au nanoparticles obtained in Preparation Example 2 have narrower and higher UV absorption peak at 300 nm. Accordingly, compared with the Au nanoparticles synthesized by using the PAMAM dendrimer having the generation number equal to 4.0 generation, the Au nanoparticles synthesized by using the PAMAM dendrimer having the generation number equal to 5.0 generation have better uniformity of the particle diameter.

The PAMAM dendrimer-Au nanoparticle composites obtained in Preparation Example 1 and Preparation Example 2 were analyzed by the transmission electron microscopy (TEM). It was confirmed that the Au nanoparticles obtained in Preparation Example 1 had a particle diameter distribution of 2.0±0.3 nm and an average particle diameter of 2 nm. The Au nanoparticles with different particle diameters may have UV absorption peak at different positions. The average particle diameter was calculated based on the image measured by the TEM (Product Model: JEOL JEM-2010F) and further confirmed by the UV-vis spectrophotometer (Product Model: LAMBDA 900). The Au nanoparticles obtained in Preparation Example 2 had a particle diameter distribution of 1±0.2 nm and an average particle diameter of 1 nm.

In this specification, the quantum dots having the core-shell structure formed by InP/ZnS is taken as an exemplary example to illustrate the preparation of the quantum dots having the core-shell structure.

Example 1

10 mL of the seed composition solution obtained in Production Example 1 (the weight of the PAMAM dendrimer-Au nanoparticle composite in the solution was 0.0013 g), 1.2 g of indium chloride ($InCl_3$), and 23.02 g of oleic acid ($C_{18}H_{34}O_2$) were added into a 250 mL three-necked flask, and the mixed solution was stirred and mixed uniformly. The mixed solution was deoxygenated at 70° C. for 3 hours. Next, the mixed solution was rapidly heated to 190° C. under nitrogen gas. After the temperature was increased to 190° C., 2 mL of tris(dimethylamino)phosphine ($P(N(CH_3)_2)_3$) was rapidly injected into the mixed solution. After the injection of tris(dimethylamino)phosphine, the first synthesis reaction began. The reaction time of the first synthesis reaction was 90 seconds.

3.794 g of zinc stearate ($Zn(C_{17}H_{35}COO)_2$), 20.1 g of 1-octadecene ($CH_3(CH_2)_{15}CHCH_3$), and 12.144 g of 1-dodecanthiol ($C_{12}H_{26}S$) were mixed and stirred to obtain a shell semiconductor precursor solution. After the first synthesis reaction was completed, the shell semiconductor precursor solution was rapidly injected into the above three-necked flask, and the temperature of the solution was increased to 250° C. The solution temperature was maintained at 250° C. for 4.5 hours in order to perform the second synthesis reaction.

After the second synthesis reaction was completed, excess ethanol was added into the solution to precipitate the core-shell quantum dots. Next, a toluene/ethanol mixed solvent was added, and the resulting mixture was centrifuged at 6,000 rpm for 30 minutes. Finally, the resulting quantum dots having the InP/ZnS core-shell structure were dispersed in toluene.

Examples 2-3

The same steps as described in Example 1 were performed except that the first synthesis reaction was performed according to the reaction conditions shown in Table 1, and the quantum dots having the InP/ZnS core-shell structure were prepared.

Example 4

The seed composition solution obtained in Production Example 1 was replaced by 10 mL of the seed composition solution obtained in Production Example 2 (the weight of the PAMAM dendrimer-Au nanoparticle composite in the solution was 0.0013 g) and the first synthesis reaction was performed according to the reaction conditions shown in Table 1. Except the above-mention differences, the same steps as described in Example 1 were performed to prepare the quantum dots having the InP/ZnS core-shell structure.

Comparative Examples 1-5

The seed composition solution was not added and the first synthesis reaction was performed according to the reaction conditions shown in Table 1. Except the above-mention differences, the same steps as described in Example 1 were performed to prepare the quantum dots having the InP/ZnS core-shell structure.

[Measurements of the Physical Properties of the Quantum Dots Having the InP/ZnS Core-Shell Structure]

The quantum dots having the InP/ZnS core-shell structure obtained in Examples 1-4 and Comparative Examples 1-5 were analyzed by the energy dispersive X-ray spectrometer. It is confirmed that all the quantum dots having the InP/ZnS core-shell structure obtained in Examples 1-4 included the gold element. It is confirmed that all the quantum dots having the InP/ZnS core-shell structure obtained in Comparative Examples 1-5 did not include the gold element.

The quantum dots having the InP/ZnS core-shell structure obtained in Examples 1-4 and Comparative Examples 1-5 were analyzed by the photoluminescence fluorescence spectrometer and were irradiated by the light source having the wavelength of 350 nm. The photoluminescence fluorescence spectrums of the quantum dots having the InP/ZnS core-shell structure obtained in Examples 1-4 and Comparative Examples 1-5 were obtained. The luminescence wavelength $\lambda$ value and the full width at half maximum (FWHM) value were shown in Table 1. The luminescence wavelength $\lambda$ value can be used to evaluate the size of the quantum dots. If the $\lambda$ value is smaller, it means that the particle diameter of the quantum dots is smaller. The full width at half maximum value can be used to evaluate the uniformity of the particle diameters of the quantum dots. If the full width at half maximum value is smaller, it means that the uniformity of the particle diameters of the quantum dots is better.

TABLE 1

| | particle diameter of Au nanoparticle (nm) | reaction condition | | $\lambda$ (nm) | FWHM (nm) |
|---|---|---|---|---|---|
| | | reaction temperature | reaction time | | |
| Example 1 | 2 | 190° C. | 90 seconds | 639 | 52 |
| Example 2 | 2 | 170° C. | 120 seconds | 503 | 43 |
| Example 3 | 2 | 170° C. | 150 seconds | 512 | 46 |
| Example 4 | 1 | 170° C. | 180 seconds | 548 | 63 |
| Comparative Example 1 | — | 220° C. | 90 seconds | 637 | 58 |
| Comparative Example 2 | — | 190° C. | 90 seconds | 501 | 43 |
| Comparative Example 3 | — | 190° C. | 60 seconds | 518 | 57 |
| Comparative Example 4 | — | 170° C. | 150 seconds | 407 | 83 |
| Comparative Example 5 | — | 220° C. | 120 seconds | 547 | 73 |

Referring to Example 1 and Comparative Example 1 shown in Table 1, in Example 1, the first synthesis reaction was performed by using the dendrimer-metal nanoparticle composite as a seed. The resulting quantum dots having the InP/ZnS core-shell structure have similar $\lambda$ values, it means that the particle diameters were similar. The reaction time of Example 1 and Comparative Example 1 was the same. However, the reaction temperature of Comparative Example 1 was 220° C. and the reaction temperature of Example 1 was only 190° C. Similarly, the reaction temperatures of Examples 2, 3 and 4 are lower than those of Comparative Examples 2, 3 and 5, respectively. Accordingly, the seed composition of the disclosure can significantly reduce the reaction temperature of the first synthesis reaction.

Furthermore, referring to Example 1 and Comparative Example 1 shown in Table 1, the particle diameters of Example 1 and Comparative Example 1 were similar. However, the FWHM value of Comparative Example 1 was 58 nm and the FWHM value of Example 1 was only 52 nm. Similarly, the reaction temperatures of Examples 3 and 4 are lower than those of Comparative Examples 4 and 5, respectively. Accordingly, the seed composition of the disclosure can significantly increase the uniformity of the particle diameters of the quantum dots.

In addition, referring to Example 3 and Comparative Example 4 shown in Table 1, the reaction condition of Example 3 was the same as those of Comparative Example 4. However, the $\lambda$ value of Example 3 was 512 nm and the $\lambda$ value of Comparative Example 4 was only 407 nm. Accordingly, the seed composition of the disclosure can significantly enhance the reactivity of the first synthesis reaction.

In summary, a method for manufacturing quantum dots is provided in the disclosure. In the manufacturing method, the synthesis reaction of the quantum dots is performed by using the dendrimer-metal nanoparticle composite as the seed composition. The method for manufacturing the quantum dots of the disclosure at least includes the following advantages:

(1) The dispersibility and chemical stability of the seed composition are good, and the attraction between the seed composition and the precursor of the quantum dots is good. Therefore, by using the seed composition, the reaction temperature of the synthesis reaction of the quantum dots can be reduced.

(2) The seed composition can reduce the reaction temperature and the reaction rate of the synthesis reaction of the quantum dots. Therefore, by using the seed composition, the process window of the synthesis reaction of the quantum dots can be controlled to within a specific range, and the process operability can be improved.

(3) The seed composition has good preservability, and therefore, it can be stored for a period of time after being synthesized. The flexibility of the process can be improved.

(4) By using the seed composition, quantum dots can be efficiently produced at low cost.

(5) The method for manufacturing the quantum dots does not use raw materials containing cadmium or mercury, and the pollution of the process and the product is low.

Although the disclosure has been described by way of example and in terms of the preferred embodiments, it should be understood that various modifications and similar arrangements (as would be apparent to those skilled in the art) can be made herein without departing from the spirit and scope of the disclosure as defined by the appended claims.

What is claimed is:

1. A method for manufacturing a quantum dot, comprising:
   (a) providing a seed composition solution, wherein the seed composition solution comprises a seed composition, and the seed composition is a dendrimer-metal nanoparticle composite;
   (b) adding a core semiconductor precursor solution into the seed composition solution, wherein the core semiconductor precursor solution comprises a first semiconductor ion and a second semiconductor ion; and
   (c) performing a first synthesis reaction to form a core semiconductor material wrapping the seed composition, wherein the core semiconductor material is formed by combining the first semiconductor ion with the second semiconductor ion.

2. The method for manufacturing a quantum dot as claimed in claim 1, wherein the metal nanoparticle comprises gold, silver, platinum or palladium.

3. The method for manufacturing a quantum dot as claimed in claim 1, wherein the metal nanoparticle is a gold nanoparticle.

4. The method for manufacturing a quantum dot as claimed in claim 1, wherein the metal nanoparticle has an average particle diameter smaller than or equal to 2 nm.

5. The method for manufacturing a quantum dot as claimed in claim 1, wherein the dendrimer is a polyamidoamine dendrimer.

6. The method for manufacturing a quantum dot as claimed in claim 5, wherein a generation number of the polyamidoamine dendrimer is equal to or greater than 4.0 generation, and equal to or smaller than 8.0 generation.

7. The method for manufacturing a quantum dot as claimed in claim 5, wherein a ratio of number of moles of the amino group of the polyamidoamine dendrimer to number of moles of the metal nanoparticle is 1-5.

8. The method for manufacturing a quantum dot as claimed in claim 1, wherein a reaction temperature of the first synthesis reaction is 170° C.–190° C.

9. The method for manufacturing a quantum dot as claimed in claim 1, wherein a reaction time of the first synthesis reaction is 90-300 seconds.

10. The method for manufacturing a quantum dot as claimed in claim 1, wherein the first semiconductor ion comprises zinc ion, boron ion, aluminum ion, gallium ion, indium ion, thallium ion, silicon ion or germanium ion.

11. The method for manufacturing a quantum dot as claimed in claim 1, wherein the second semiconductor ion comprises nitrogen ion, phosphorus ion, arsenic ion, antimony ion, sulfide ion, selenium ion, tellurium ion or tin ion.

12. The method for manufacturing a quantum dot as claimed in claim 1, further comprising:
   (d) after forming the core semiconductor material, adding a shell semiconductor precursor solution, wherein the shell semiconductor precursor solution comprises a third semiconductor ion and a fourth semiconductor ion; and
   (e) performing a second synthesis reaction to form a shell semiconductor material wrapping the core semiconductor material, wherein the shell semiconductor material is formed by combining the third semiconductor ion with the fourth semiconductor ion.

13. A quantum dot, comprising:
   a seed, wherein the seed comprises a metal nanoparticle, and the metal nanoparticle comprises gold, silver, platinum or palladium;
   a core semiconductor material wrapping the seed, wherein the core semiconductor material is formed by combining a first semiconductor ion with a second semiconductor ion; and
   a shell semiconductor material wrapping the core semiconductor material, wherein the shell semiconductor material is formed by combining a third semiconductor ion with a fourth semiconductor ion.

14. The quantum dot as claimed in claim 13, wherein a crystal phase of the metal nanoparticle is compatible with a crystal phase of the core semiconductor material.

15. The quantum dot as claimed in claim 13, wherein the core semiconductor material comprises a Group II/VI compound, a Group III/V compound or a Group IV/VI compound.

* * * * *